Figure 1:
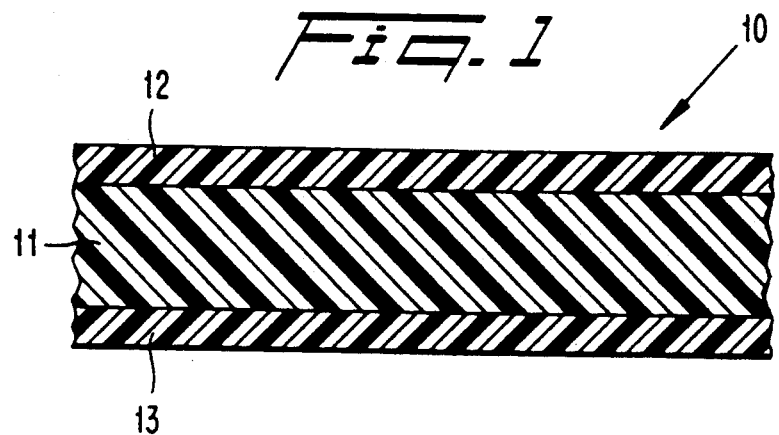

United States Patent [19]
Rosen

[11] Patent Number: 5,234,763
[45] Date of Patent: Aug. 10, 1993

[54] PACKAGING MATERIAL AND ALSO USE OF THE MATERIAL FOR THE MANUFACTURE OF CONTAINERS

[75] Inventor: Ake Rosen, Helsingborg, Sweden

[73] Assignee: Tetra Alfa Holdings S.A., Pully, Switzerland

[21] Appl. No.: 818,157

[22] Filed: Jan. 8, 1992

[30] Foreign Application Priority Data

Jan. 9, 1991 [SE]  Sweden ........................... 9100056

[51] Int. Cl.⁵ .............................................. B32S 7/12
[52] U.S. Cl. ................................. 428/349; 428/35.7; 428/516; 428/402
[58] Field of Search ............... 428/516, 402, 349, 35.7

[56] References Cited

U.S. PATENT DOCUMENTS 4,948,665  8/1990  Rosen ................................. 428/332

FOREIGN PATENT DOCUMENTS 204324  12/1986  European Pat. Off. .
353496   2/1990  European Pat. Off. .
353991   2/1990  European Pat. Off. .
1521568 10/1975  United Kingdom .
WO89/02859 4/1989 World Int. Prop. O. .

Primary Examiner—Edith Buffalow
Attorney, Agent, or Firm—Burns, Doane, Swecker & Mathis

[57] ABSTRACT

Flexible packaging material in the form of a sheet or strip for shaping into form-stable, liquid-tight containers through fold forming, thermo-forming or other mechanical processing for shaping the material. The material (10) has a stiffening skeletal layer (11) composed of a mixture of plastic and filler to the amount of between 50 and 80% of the total weight of the mixture, and also at least one outer layer (12; 13) of plastic of the same kind as the plastic in the skeletal layer (11).

With the aid of the said outer plastic layers the material is given excellent sealing properties, at the same time as the filler in the skeletal layer (11) can be effectively protected against attack from the contents of the container produced.

22 Claims, 1 Drawing Sheet

PACKAGING MATERIAL AND ALSO USE OF THE MATERIAL FOR THE MANUFACTURE OF CONTAINERS

The present invention concerns a flexible packaging material in the form of a sheet or strip for shaping into form-stable, liquid-tight containers through fold forming, thermo-forming or other mechanical processing for shaping the material, and this material has a stiffening skeletal layer composed of a mixture of plastic and filler.

A packaging material of the type which is described above is known through, for example, EP-A-O 353 496. A similar packaging material is also known through EP-A-O 353 991.

The known packaging material according to the aforesaid EP-A-O 353 496 contains one or more skeletal layers laminated to each other, of which each one consists of a mixture of either a propylene homopolymer containing between 50 and 80% filler or of an ethylene/propylene copolymer containing between 50 and 80% by weight filler. As an example of a filler there are proposed among other things chalk, talc and mica either each one individually or in optional combinations with each other. The preferred filler is chalk.

From a strip of the known packaging material finished consumer packagings of disposable character are produced by fold forming through the strip first being shaped into a tube through the two longitudinal edges of the strip being joined to each other in a longitudinal overlap joint. The tube is filled with the contents in question and is separated into closed, cushion-shaped packaging units through repeated transverse sealing of the tube below the level of the tube's contents. The packaging units are separated from each other through cuts in the transverse sealing zones and given the desired geometric final form, generally that of a parallepiped, through a further shaping and sealing operation during which the double-walled triangular corner flaps of the packagings are folded in towards and sealed to a side of the packaging situated nearby.

From the known packaging material other conventional types of consumer packagings can also be produced. For example from prefabricated, flat substances packagings of roof-ridge material (gable top packagings) are produced through two opposite sides of the substance being joined to each other in a longitudinal overlap joint to form a tubular capsule. The capsule is given some form of bottom closure and is then filled with the contents in question. After filling, the capsule's open end is closed through bellows folding and sealing of the capsule's free end parts to form the finished gable top packaging.

The production of packagings of the material described above is nowadays* most often carried out on a large industrial scale with the aid of conventional packaging machines which both form, fill and close the packagings.

*Assuming munera to be a misprint for numera

The requirements set for these so-called disposable packagings are that they must give the best possible chemical and mechanical protection to the product packaged and that the packagings must be sufficiently form-stable and mechanically strong to be able to be handled conveniently without being deformed or damaged in another way.

The above described known packaging material has good form stiffness and other mechanical properties necessary for manufacture of form-stable packagings, but has in practice proved to be difficult to seal with heat sealing, which has often entailed that the sealing joints showed local seal deficiencies and/or were too mechanically weak to resist further stresses in normal handling of the packages during transport etc.

Another problem which often arises in packagings manufactured from the known packaging material concerns the filler in the skeletal layer facing the inside wall and exposed to the contents of the packaging. Some of the contents listed above, in particular chalk, are hygroscopic and sensitive to contents with low or acid pH values, such as juice and other acid-containing liquids which may come into contact with and react chemically with the filler in the skeletal layer. The problem is particularly serious with high filler contents and already leads a short time after packaging to dissolution or other chemical breakdown of the filler with consequent deterioration in stability of form in the packaging. The attack can even be so strong that the wall of the packaging is more or less perforated entirely through the aggressive effect of the contents on the filler.

An aim of the present invention is therefore to give indications of a packaging material of the type described in the introduction without resultant problems of the type that is inherent in the known packaging material.

These and other aims and advantages are achieved according to the invention through the fact that the packaging material is given the characteristic that at least one side of the packaging material exhibits an outer sealing and/or protective layer of plastic of the same material as the plastic in the skeletal layer, attached to the skeletal layer with good adhesion.

With the aid of the said outer layer, which should preferably be placed on the inside of the packaging material (of the container produced), the filler in the skeletal layer is thus given an effective protection against the chemical action from the contents of the container which are utterly and completely prevented from coming into contact with the skeletal layer behind it. This entails that even specially pH-sensitive fillers, such as for example chalk, can advantageously be used in the skeletal layer in the packaging material according to the invention without the risk of being attacked and destroyed, even if the container produced is filled with contents with low pH values. If the plastic both in the skeletal layer and in the aforesaid outer layer is of the polyolefin type the advantage is also gained that during the manufacture of the container the packaging material can be sealed by what is known as heat sealing, which is a simple, effective and frequently used method of sealing in connection with packaging.

Since the plastic in the skeletal layer and the aforesaid outer layer will be of the same material the laminated packaging material according to the invention will in addition be a homogeneous material and thereby a very economical and advantageous material from the recuperation and environmental point of view.

Preferably the aforesaid outer layer is or outer layers are attached to the skeletal layer through surface fusion of the plastic in the respective neighbouring layers, which gives good adhesion and makes the material able to resist very strong external stresses without the risk of delamination.

Further practical and advantageous embodiments of the packaging material according to the invention have also been given the characteristics stated in the subclaims below.

Figure 2:
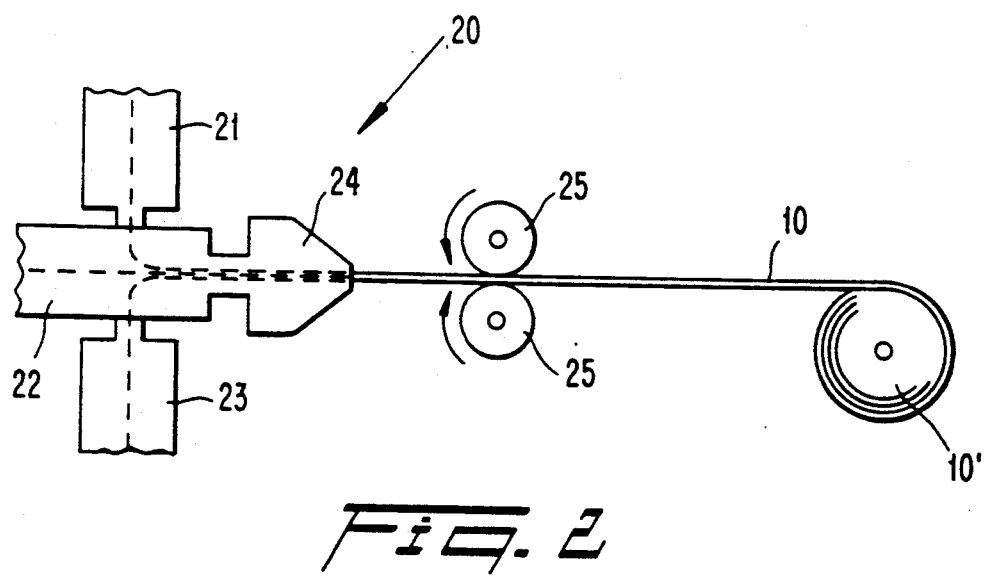

The invention will be described below and further explained with particular reference to the enclosed drawing in which FIG. 1 shows schematically a cross section of a packaging material according to a preferred embodiment of the invention, and FIG. 2 illustrates schematically the production of the packaging material according to FIG. 1.

The packaging material according to the invention has been given in the embodiment shown in FIG. 1 the general reference designation 10. The material 10, which can be either in the form of a strip or in the form of a sheet, has a stiffening skeletal layer 11 which has on at least one of its sides (corresponding to the inside of the finished packaging) an outer sealing and/or protective layer 12 attached to the skeletal layer with good adhesion. In the embodiment shown the other side of the skeletal layer 11 is also provided with an outer sealing and/or protective layer 13 likewise attached to the skeletal layer with good adhesion.

The skeletal layer 11 is composed of a mixture of plastic, preferably polyolefin, and filler to an amount of between 50 and 80% of the total weight of the mixture. The plastic in the skeletal layer can be polythene, polypropylene etc., but is preferably a polypropylene based plastic such as a propylene homopolymer with a melting index of under 10 according to ASTM (2.16 kg; 230° C.) or an ethylene/propylene copolymer with a melting index of between 0.5 and 5 according to ASTM (2.16 kg; 230° C.). Of these two preferred examples ethylene/propylene copolymer is the most preferred plastic, since it retains its good mechanical strength properties and sealing properties right down to low temperatures, for example 8° C. and lower. The filler, which gives the skeletal layer added stiffness, can be any filler known in this sphere such as powdered, granular and/or flaked chalk, lime, mica, clay etc. each on its own or in any desired combinations with each other. A particularly preferred filler is chalk.

The outer layer 12, as also the outer layer 13, is composed of plastic, preferably polyolefin, of the same type as the plastic in the skeletal layer 11. Examples of suitable plastics are thus polythene, polypropylene etc, preferably a polypropylene based plastic such as a propylene homopolymer with a melting index of under 10 according to ASTM (2.16 kg; 230° C.) or an ethylene/propylene copolymer with a melting index of between 0.5 and 5 according to ASTM (2.16 kg; 230° C.). But the two outer layers are each composed individually of an ethylene/propylene copolymer with a melting index in the aforesaid range of 0.5-5.

The skeletal layer 11 and the two outer layers 12 and 13 are preferably attached to each other through surface fusion of the plastic in the respective neighbouring layers. Such a surface fusion ensures good adhesion between the layers and makes the packaging material particularly resistant to external stresses without the risk of delamination.

As can be seen from FIG. 1 the skeletal layer 11 is much thicker than the two outer layers 12 and 13. The thickness of the skeletal layer 11 can vary within wide limits, but is generally situated within the range 150–1400 μm. If the packaging material is to be used for production of containers through thermo-forming or other mechanical processing for shaping, the skeletal layer 11 preferably has a thickness in an upper part of the given range, e.g. between 1000 and 1400 μm, while the thickness is preferably situated in a lower part of the range, e.g. 150–300 μm, if the material is to be used for production of a container through fold forming. The two outer layers 12 and 13 each have individually thicknesses within the range 5–50 μm which have been shown in practice to give the material the desired good sealing and protective properties.

The material 10 can be produced through extrusion of each layer of material on its own, but is preferably produced through co-extrusion with the use of a device of the type which is shown schematically in FIG. 2. The device 20 comprises three extruders coupled together 21, 22, 23 with a common extruder orifice 24, also a cylinder or roller device placed in front of the orifice head 24 comprising two cylinders or rollers 25 rotating in the direction of the arrows.

The device 20 operates in accordance with known technology through the fact that the centrally situated extruder 22 screws forward melted output material for the skeletal layer 11, i.e. a mixture of the plastic selected and filler homogeneously distributed in the plastic to an amount of between 50 and 80% of the total weight of the mixture, while the extruders 22 and 23 placed on both sides of the extruder 22 screw forward in a corresponding manner the respective output material for the two outer layers of the material 12 and 13, i.e. melted plastic of the same kind as the plastic chosen for the skeletal layer 11. The three streams of melted material are pressed out through the slot-shaped opening in the orifice head 24 and taken together through the squeeze between the two contra-rotating, cooled cylinders or rollers 25 which press the layers together with the necessary compression pressure to form the finished packaging material 10. The packaging material can then be rolled up on to a feed roller 10'. Through the pressing together with the aid of the cylinders or rollers 25 the melted extruded material is cooled down with simultaneous binding together of the respective layers of material through surface fusion between the plastic in the respective neighbouring layers, through which good adhesion is ensured between the layers of material 11, 12 and 13 in the finished packaging material.

In accordance with the present invention it is thus possible in a simple manner with the use of already existing technology to produce a packaging material in the form of a sheet or strip which exhibits good binding strength between all the layers of material forming part of the material and which can also be sealed with good binding strength through what is known as heat sealing during the shaping of the material into containers. Through the fact that the skeletal layer is fully protected, at least on the side which is intended to be facing the inside of the container, by an outer layer attached to the skeletal layer with good adhesion, which protects the skeletal layer and in particular the filler against direct contact with the contents of the container, chalk can with advantage be used as a filler without the risk of attack by the contents, even if these consist of a liquid with a high degree of acidity (low pH value). The material is in addition easily recuperable through the fact that all the layers of material forming part of the material contain plastic of the same type, which entails that the material can be shaped into containers with the least possible loss of material, whether the material is shaped by fold forming, thermo-forming or other mechanical processing for shaping.

Even if the invention has been described with particular reference to a single embodiment as a preferred example it should be observed that several modifications obvious for the specialist are possible within the framework of the idea of the invention as this is defined by the following patent claims.

I claim:

1. A flexible packaging material comprising:
   a stiff skeletal layer with a first side corresponding to an inner surface of a packaging material and a second side corresponding to an outer surface of the packaging material, said skeletal layer comprising a mixture of plastic and filler, and
   an outer layer on the first side of the skeletal layer consisting of plastic of the same material used in the skeletal layer.

2. The flexible packaging material of claim 1, further comprising a second outer layer on the second side of the skeletal layer comprising plastic of the same material used in the skeletal layer.

3. The flexible packaging material of claim 1, wherein the flexible packaging material is in the shape of a sheet or strip.

4. The packaging material of claim 1, wherein the outer layer is attached to the skeletal layer through surface fusion of the plastic in the skeletal layer and the outer layer.

5. The packaging material of claim 2, wherein the second outer layer is attached to the skeletal layer through surface fusion of the plastic in the skeletal layer and the second outer layer.

6. The packaging material of claim 2, wherein the skeletal layer, the outer layer and the second outer layer are manufactured through extrusion.

7. The packaging material of claim 2, wherein the skeletal layer, the outer layer and the second outer layer are manufactured through co-extrusion.

8. The packaging material of claim 2, wherein the plastic in the skeletal layer, the outer layer and the second outer layer is composed of a propylene homopolymer or an ethylene propylene copolymer.

9. The packaging material of claim 1, wherein the filler in the skeletal layer consists of powdered, granular or flaked chalk, lime, mica, or clay either individually or in combination.

10. The packaging material of claim 2, wherein the filler in the skeletal layer consists of powdered, granular or flaked chalk, lime, mica, or clay either individually or in combination.

11. The packaging material of claim 1, wherein the amount of filler in the skeletal layer is between 50 and 80% of the total weight of the mixture.

12. The packaging material of claim 2, wherein the amount of filler in the skeletal layer is between 50 and 80% of the total weight of the mixture.

13. The packaging material of claim 2, wherein the skeletal layer has a thickness of between 150 and 1500 μm and the outer layer has a thickness of between 5 and 50 μm.

14. The packaging material of claim 13, wherein the second outer layer has a thickness of between 5 and 50 μm.

15. A process of the manufacture of a form-stable, liquid-tight container comprising:
    forming a flexible packaging material comprising a skeletal layer, an outer layer on a first side of the skeletal layer corresponding to an inner surface of the container and a second outer layer on a second side of the skeletal layer corresponding to an outer surface of the container wherein the skeletal layer comprises a mixture of plastic and filler, the outer layer consists of plastic of the same material used in the skeletal layer and the second outer layer comprises plastic of the same material used in the skeletal layer, and
    forming the flexible packaging material into containers through mechanical processing.

16. The process of claim 15 wherein the mechanical processing is fold-forming or thermo-forming.

17. The process of claim 15 wherein the plastic is composed of a propylene homopolymer or an ethylene propylene compolymer.

18. A flexible packaging material comprising:
    a stiff skeletal layer with a first side corresponding to an inner surface of a packaging material and a second side corresponding to an outer surface of the packaging material, said skeletal layer comprising a mixture of plastic and filler, and
    an outer layer on the first side of the skeletal layer comprising plastic of the same material used in the skeletal layer in the absence of filler.

19. The flexible packaging material of claim 18, further comprising a second outer layer on the second side of the skeletal layer comprising plastic of the same material used in the skeletal layer.

20. The flexible packaging material of claim 18, wherein the outer layer is attached to the skeletal layer through surface fusion of the plastic in the skeletal layer and the outer layer.

21. The flexible packaging material of claim 19, wherein the second outer layer is attached to the skeletal layer through surface fusion of the plastic in the skeletal layer and the second outer layer.

22. The flexible packaging material of claim 19, wherein the plastic in the skeletal layer, the outer layer and the second outer layer is composed of a propylene homopolymer or an ethylene propylene copolymer.

* * * * *